United States Patent [19]

Blomdahl

[11] 4,449,030

[45] May 15, 1984

[54] APPARATUS FOR SENSING THE DISTANCE BETWEEN AN OBJECT OF ELECTRICALLY CONDUCTIVE MATERIAL AND A REFERENCE POINT

[76] Inventor: Sven G. R. Blomdahl, Trastvägen 6, S-241 00, Eslöv, Sweden

[21] Appl. No.: 392,075

[22] Filed: Jun. 25, 1982

[30] Foreign Application Priority Data

Jul. 3, 1981 [SE] Sweden ................... 8104141

[51] Int. Cl.³ ............................... B23K 9/10
[52] U.S. Cl. ....................... 219/124.34; 219/124.03
[58] Field of Search ............ 219/124.34, 125.12, 219/124.03; 324/126

[56] References Cited

U.S. PATENT DOCUMENTS

| | | | |
|---|---|---|---|
| 4,041,373 | 8/1977 | Maringer | 324/126 |
| 4,090,130 | 5/1978 | Willenbecher, Jr. | 324/126 |
| 4,121,154 | 10/1978 | Keating | 324/126 |
| 4,249,062 | 2/1981 | Hozumi et al. | 219/124.34 |

FOREIGN PATENT DOCUMENTS 54-23055  2/1979  Japan.

*Primary Examiner*—C. C. Shaw

[57] ABSTRACT

An apparatus for sensing the distance between an object of electrically conductive material and a reference point has an electrode, the tip of which constitutes the reference point. The electrode is connected via a supply line to a high voltage source adapted to generate high voltage pulses to provide an arc between the electrode tip and the object. The apparatus also has an air-cored measuring coil disposed around the supply line for sensing the electric field about said supply line and transmitting to a measuring signal sensing circuit a measuring signal proportional to the electric field. The measuring signal sensing circuit preferably comprises a comparator unit adapted to compare the measuring signal with a signal corresponding to a predetermined distance between the object and the electrode point.

5 Claims, 10 Drawing Figures 4,449,030

APPARATUS FOR SENSING THE DISTANCE BETWEEN AN OBJECT OF ELECTRICALLY CONDUCTIVE MATERIAL AND A REFERENCE POINT

BACKGROUND OF THE INVENTION

This invention relates to an apparatus for sensing the distance between an object of electrically conductive material and a reference point, said apparatus comprising an electrode with a tip forming the reference point.

Distance and position sensors of various types are well known. Some of these apparatus are utilized especially in so-called seam followers for mechanized or automated welding where they sense the distance to or the position of a seam and transmit signals responsive thereto to a signal transducer converting said signals into signals for controlling servo units. These servo units are connected to a holder, such as crossing slides carrying a welding gun, and control the adjustment of said holder and thus the position of the welding gun relative to the seam.

Seam followers of this type may be characterized according to the sensing principle which is utilized, i.e. according to the type of sensor or transducer, and in this respect one distinguishes between contact transducers and contactless transducers. Contactless transducers are transducers establishing an electric or mechanical contact with the object and thus are no distance sensors. Distance sensors are contactless. Examples of contactless transducers are inductive and capacitive transducers.

The main object of this invention is to provide a relatively simple and inexpensive, but nevertheless reliable apparatus for sensing the distance between an object of electrically conductive material and a reference point.

A further object of this invention is to provide a distance sensor which is well suited for use in a contactless seam follower for mechanized or automated welding. A further object of this invention is to provide a distance sensor which, in contrast to, for example, certain types of capacitive and inductive transducers, requires a very small measuring surface on the object and which, when used in connection with a seam follower of the above-mentioned type, can be disposed close to the welding gun.

According to the invention, these objects are realized by means of an apparatus which is of the abovementioned type and is characterized by a high voltage source to which the electrode is connected via a supply line and which is adapted to generate high voltage pulses for generating an arc between the electrode tip and the object, and a measuring means which is adapted to sense the electric field around the supply line and to transmit a measuring signal proportional to said field and is connected to a measuring signal sensing circuit.

In a preferred embodiment of the invention, the measuring means is an air-cored measuring coil, one end of which is free, while the other end is connected to the measuring signal sensing circuit. In the preferred embodiment, the measuring coil furthermore is disposed around the supply line, and the measuring signal sensing circuit comprises a comparator unit adapted to compare the measuring signal to a signal corresponding to a predetermined distance between the object and the electrode point.

BRIEF DESCRIPTION OF THE DRAWINGS

The invention will now be described in more detail with reference to the accompanying drawings in which.

DESCRIPTION OF THE PREFERRED EMBODIMENTS

Figure 1:
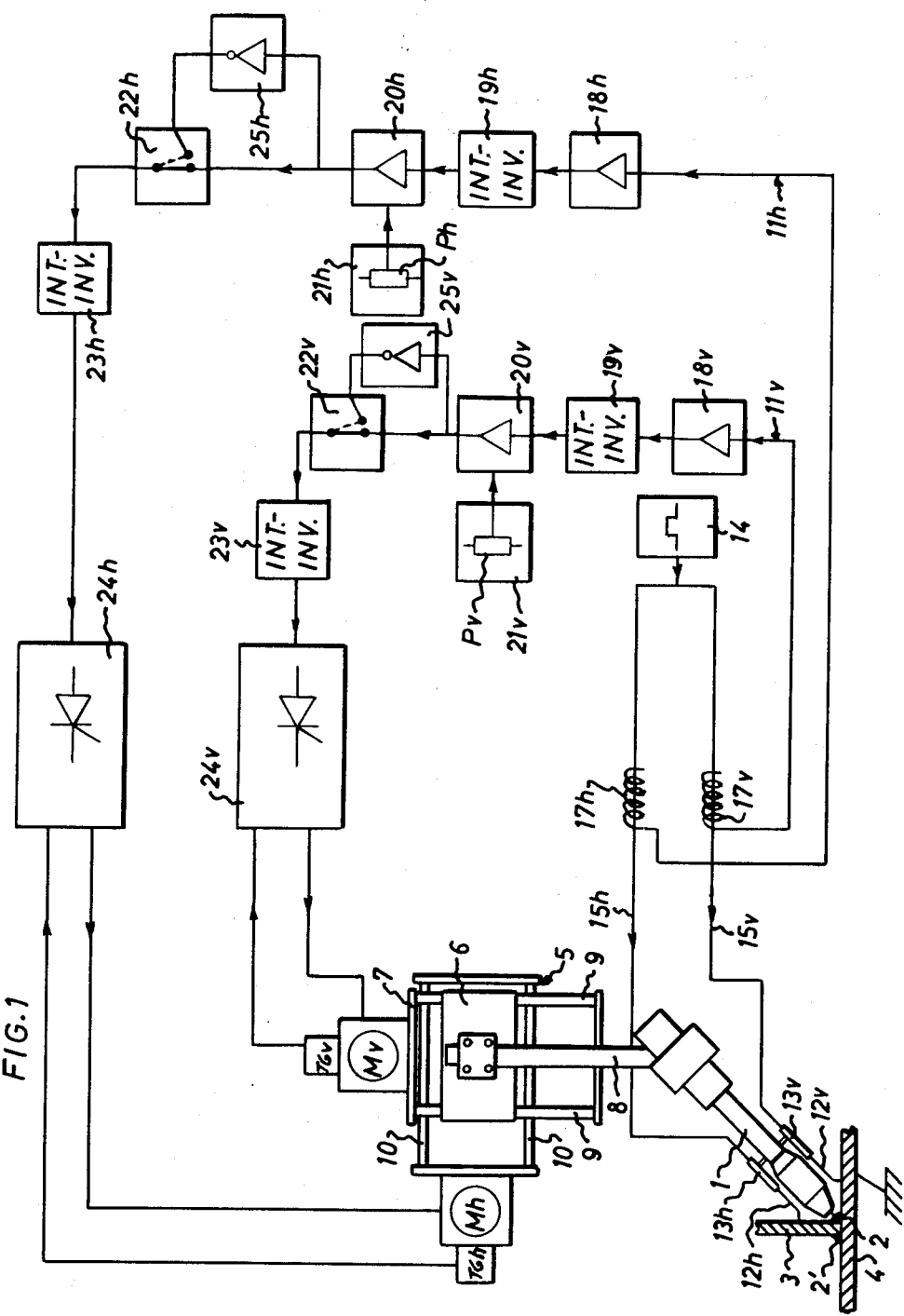
FIG. 1 illustrates schematically two distance sensors according to the invention as transducers in a seam follower for mechanized welding, and the associated electric circuits.
Figure 1A:
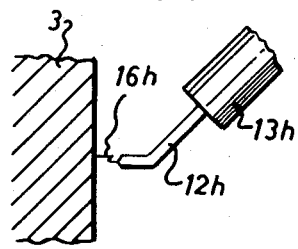
FIG. 1A illustrates, on a larger scale, a horizontal position sensing electrode.

In broad outline, the seam follower for mechanized welding which is schematically illustrated in FIG. 1 operates as follows. A welding gun 1 is adapted to provide a weld 2 in a seam between a first workpiece 3 which is shown vertically in FIG. 1, and a second workpiece 4 which is shown horizontally in FIG. 1. The workpieces 3 and 4 here consist of electrically conductive metal sheets connected to earth. The workpieces 3 and 4 and the welding gun 1 are movable relative to one another at right angles to the plane of the drawings. In the embodiment illustrated, the workpieces 3 and 4 are moved, whereas the welding gun 1 is movable only in the plane of the drawings, i.e. in a plane perpendicular to the direction of travel of the workpieces 3 and 4. The welding gun 1 is moved by means of an arrangement 5 of two crossing slides 6 and 7 movable relative to one another. The slide 6 which is fixedly connected to the welding gun via a holder 8, is movable, by means of a motor Mv, back and forth along two vertical sliding bars 9 fixedly connected with the slide 7. The slide 7 which thus carries the slide 6 is movable, by means of a motor Mh, back and forth along two stationary horizontal sliding bars 10.

An arrangement 11v according to the present invention senses the vertical distance to the horizontal workpiece 4 and transmits to the motor Mb a control signal responsive to the distance sensed, for controlling the vertical position of the welding gun 1. A similar arrangement 11h according to the present invention senses the horizontal position to the vertical workpiece 3 and transmits to the motor Mh a control signal responsive to the distance sensed, for controlling the horizontal position of the welding gun 1. By continuously sensing both the vertical and the horizontal distance and continuously controlling, in response thereto, the respective motor Mv and Mh, the position of the welding gun 1 relative to the seam between the workpieces 3 and 4 is controlled. The welding gun 1 can be made to accurately follow the seam during movement of the workpieces 3 and 4 relative to the welding gun.

The sensor 11h according to the present invention will now be described in more detail with reference to FIGS. 1, 1A and 2A–2G. The sensor 11h has a high voltage electrode 12h, preferably of tungsten carbide, fixedly connected to the welding gun 1 by means of an insulating portion 13h. A pulse generator 14 supplies the electrode 12h, via a supply line 15h, with high voltage pulses (FIG. 2A) for generating an arc 16h (FIG. 1A) between the point of the electrode 12h and the grounded vertical workpiece 3. As will appear from FIG. 2A, the high voltage pulses are square pulses which, in the embodiment illustrated, have a pulse length of about 18 ms and a pulse gap of about 150 μs, which corresponds to about 512 pulses per second, and a pulse height of about 10 kV.

An air-cored measuring coil 17h, one end of which is free, is disposed around the supply line 15 for sensing the electric field around said line. This electric field is dependent upon the length of the arc 16h, i.e. upon the distance between the point of the electrode 12h and the workpiece 3, and produces in the measuring coil 17h a measuring signal, the amplitude of which is proportional to the said distance. The other end of the measuring coil 17h is connected to an amplifier 18h. At a given distance, i.e. the distance having the desired value, between the point of the electrode 12h and the workpiece 3, the amplifier 18h will obtain the input signal (measuring signal) shown in FIG. 2B and transmit the output signal shown in FIG. 2C. As can be seen, the input signal varies between −5 V and +5 V, and the output signal 0 V and +24 V.

The amplifier 18h is connected to an integrator-inverter 19h integrating the output signal of the amplifier 18h and inverting the integrated signal. The output signal from said integrator-inverter 19h is shown in FIG. 2D. As can be seen, the output signal level is −8 V for the distance of the desired value.

The integrator-inverter 19h is connected to one input of an amplifier 20h connected as a summer. A D.C. source 21h, the output signal of which constitutes the reference signal and can be set by means of a potentiometer Ph, is connected to the other input of the amplifier 20h. The output signal of the D.C. source 21h has been adjusted, by means of the potentiometer Ph, to a value corresponding to the desired distance between the electrode 12h and the workpiece 3, in the present instance, and as is shown in FIG. 2E, to +8 V. The amplifier 20h adds up the two input signals and transmits a sum signal, which, as is shown in FIG. 2F, is a "zero signal" since the distance between the electrode 12h and the workpiece 3, in the embodiment illustrated, equals the desired distance.

Via a switch 22h, the amplifier 20h is connected to an integrator-inverter 23h integrating the output signal of the amplifier 20h, to prevent self-oscillation within the system, and inverting the integrated signal. The integrator-inverter 23h transmits for the desired distance the signal shown in FIG. 2G.

The integrator-inverter 23h is connected to a motor control unit 24h which is a four-quadrant control unit of known construction and is connected to the motor Mh which, in its turn, is fed back to the motor control unit via a tachometer-generator TGh. The motor control unit is so arranged that, upon receipt of a positive signal, it causes the motor Mh to rotate clockwise, which in the present case means that the slide 7 of the crossing slides arrangement 5 and thus the welding gun 1 are moved to the left with respect to FIG. 1, whereby the distance of the welding gun 1 and the electrode 12h to the workpiece 3 is reduced, that the motor control unit, upon receipt of a negative signal, causes the motor Mh to rotate counterclockwise, which in the present case means that the slide 7 and the welding gun are moved to the right with respect to FIG. 1, whereby the distance of the welding gun 1 and the electrode 12h to the workpiece 3 is increased, and that the motor control unit, when the input signal is zero, i.e. when the desired distance has been achieved, holds the motor Mh stationary so that the slide 7 and the welding gun 1 are retained in their positions relative to the workpiece 3. The speed of the motor Mh is proportional to the input signal to the motor control unit 24h.

Figure 1B:
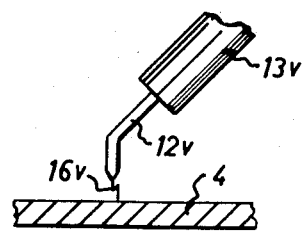
FIG. 1B illustrates, on a larger scale, a vertical position sensing electrode.

The sensor 11v is identical with and operates in the same manner as the sensor 11h described above. Thus, the sensor 11v has a high voltage electrode 12v fixedly connected to the welding gun 1 by means of an insulating portion 13V and supplied by the pulse generator 14 via a supply line 15v with the same high voltage pulses (FIG. 2A) as the electrode 12h, in order to generate an arc 16v (FIG. 1B) between the tip of the electrode 12v and the grounded horizontal workpiece 4.

Figure 2A:
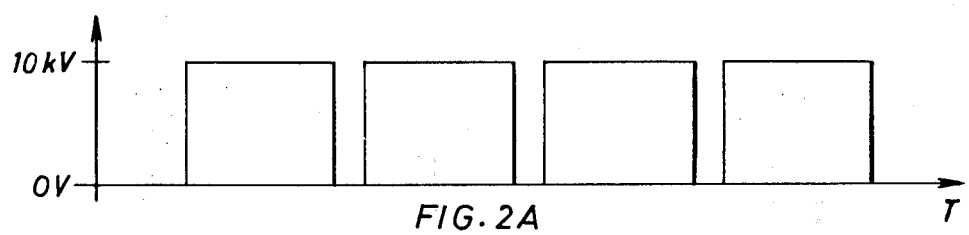
FIGS. 2A–2G illustrate voltage signals at different points in the electric circuits at a desired distance between the electrode and the object.
Figure 2B:
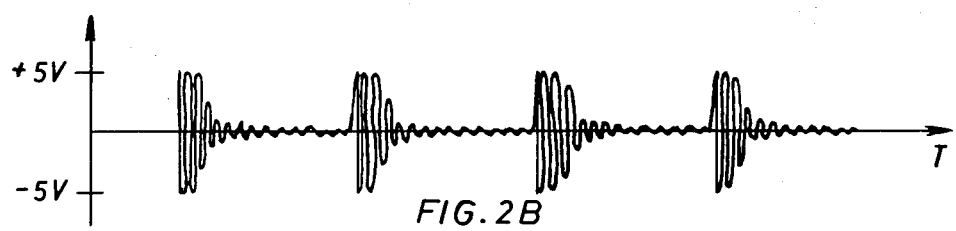
Figure 2C:
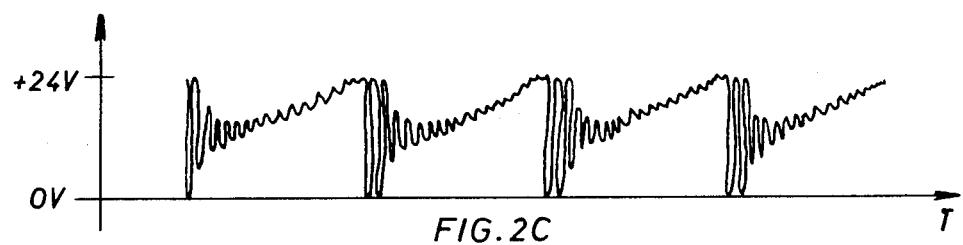
Figure 2D:
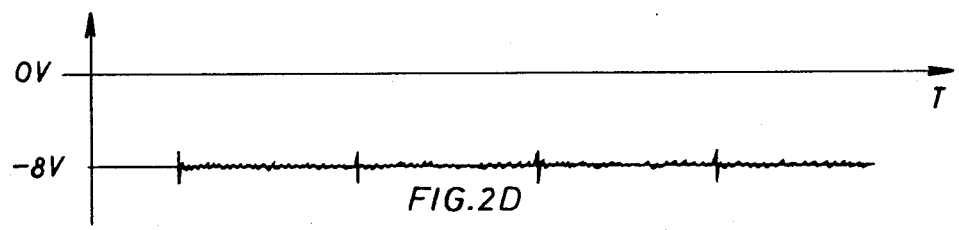
Figure 2E:
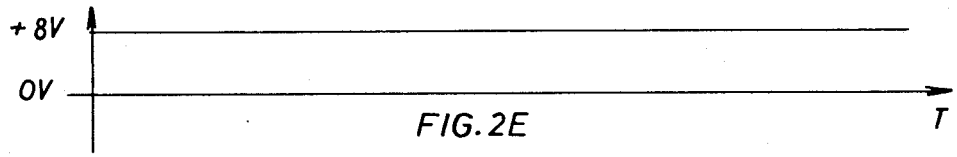
Figure 2F:
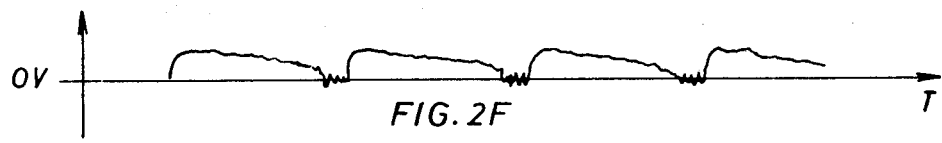

It should be stressed that not only FIG. 2A, but also FIGS. 2B-2G are valid for the sensor 11v.

Furthermore, the sensor 11v has an air-cored measuring coil 17v which senses the electric field around the supply line 15v and whose one end is free, while its other end is connected to an amplifier 18v (see FIG. 2B). The amplifier 18v is connected to an integrator-inverter 19v (see FIG. 2C) which, in its turn, is connected to one input of an amplifier 20v connected as a summer (see FIG. 2D). A D.C. voltage source 21v whose output signal constitutes the reference signal and which is adjustable by means of a potentiometer Pv, is connected to the other input of the amplifier 20v and transmits a signal corresponding to the desired distance between the electrode 12v and the workpiece 4 (see FIG. 2E).

Figure 2G:
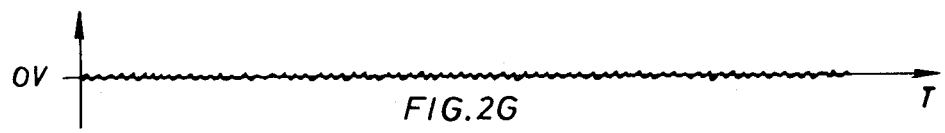

The amplifier 20v is connected, via a switch 22v, to an integrator-inverter 23v preventing self-oscillation (see FIG. 2F) and connected, in its turn, to a motor control unit 24v (see FIG. 2G). Like the motor control unit 24h, the motor control unit 24v is a four-quadrant control unit of known construction and is connected to the motor Mv which, in its turn, is fed back to the motor control unit 24v via a tachometer generator TGv. The motor control unit 24v is so arranged that, upon receipt of a positive signal, it causes the motor Mv to rotate counterclockwise, which in the present case means that the slide 6 and the welding gun 1 are moved downwardly with respect to FIG. 1, whereby the distance of the welding gun 1 and the electrode 12v to the workpiece 4 is reduced, that the motor control unit, upon receipt of a negative signal, causes the motor Mv to rotate clockwise, which in the present case means that the slide 6 and the welding gun 1 are moved upwardly with respect to FIG. 1, whereby the distance of the welding gun 1 and the electrode 12v to the workpiece 4 is increased, and that the motor control unit, when the input signal is zero, i.e. when the desired distance has been achieved, holds the motor Mv stationary so that the slide 6 and the welding gun 1 are retained in their positions relative to the workpiece 4. The speed of the motor Mv is proportional to the input signal to the motor control unit 24v.

If the distance of the electrode 12h to the workpiece 3 is greater than the desired distance, the amplitude of the measuring signal is increased, and at the said one input of the amplifier 20h there is obtained a signal which is more negative than the corresponding signal for the desired distance. At the output of the amplifier 20h, there is thus obtained a negative signal which, in its turn, gives a positive signal as an input signal to the motor control unit 24h. As has been mentioned above, this positive signal causes the slide 7 and the welding gun 1, and thus the electrode 12h, to move to the left with respect to FIG. 1, i.e. closer to the workpiece 3. If the distance of the electrode 12h to the workpiece 3 is smaller than the desired distance, the slide 7 and the welding gun 1, and thus the electrode 12h, are moved, in analogous manner, to the right with respect to FIG. 1, i.e. away from the workpiece 3.

If the distance of the electrode 12v to the workpiece 4 is greater or smaller than the desired distance, the slide 6 and the welding gun 1, and thus the electrode 12v, are moved, in analogous manner, closer to and further away from, respectively, the workpiece 4.

As is shown in FIG. 1, the circuit of the sensor 11h comprises between the amplifier 20h and the switch 22h inverter 25h connectible by means of the switch and having an amplification of 1:1. The inverter 25h is adapted to be activated when the welding gun 1 is to provide a weld 2' on the other side of the workpiece 3. In this instance, the welding gun 1 is mounted on the underside of the workpiece 3, i.e. on the same side as the weld 2''. Because of the inversion accomplished by the inverter 25h, the motor control unit 24h will also in this instance obtain input signals having the appropriate polarity for correctly controlling the positions of the slide 7 and welding gun 1.

Naturally, an inverter 25v corresponding to the inverter 25h may be utilized also in the circuit of the sensor 11v. Connection of this inverter 25v is required if welding is effected on the lower side of the workpiece, instead of on the upper side thereof.

As will be apparent from the above, the present invention provides a relatively simple and inexpensive and, at the same time, reliable apparatus for sensing the distance between an object of electrically conductive material and a reference point which here is defined by the electrode tip. As will also be apparent from the above, the apparatus according to the present invention is well suited for use in a contactless seam follower for mechanized or automated welding. The apparatus of the present invention requires but a very small measuring surface on the object and therefore can be utilized for instance for distance sensing very close to an edge of the object.

What I claim and desire to secure by Letters Patent is:

1. An apparatus for sensing the distance between a workpiece of electrically conductive material and a reference point, the apparatus comprising: a welding gun for forming a seam on the workpiece, an electrode rigidly connected to the welding gun, electrically insulated from the welding gun and having a tip forming the reference point, supply line means for connecting said electrode to a high voltage source and generating high voltage pulses thereby generating an arc between the electrode tip and the workpiece, measuring means for sensing the electric field around the supply line means and for generating a measuring signal corresponding to the electric field, a measuring signal sensing circuit for determining the distance between the workpiece and reference point based upon the measuring signal, and transmitting means for connecting the measuring means to the measuring signal sensing circuit.

2. An apparatus as claimed in claim 1, wherein said measuring means is an air-cored measuring coil.

3. An apparatus as claimed in claim 2, wherein said measuring coil has one free end and another end connected to the measuring signal sensing circuit.

4. An apparatus as claimed in claim 2, wherein said measuring coil is disposed around the supply line means.

5. An apparatus as claimed in claim 1 2, 3 or 4, wherein the measuring signal sensing circuit comprises comparator means for comparing the measuring signal to a signal corresponding to a predetermined distance between said object and said electrode tip.

* * * * *

UNITED STATES PATENT AND TRADEMARK OFFICE
CERTIFICATE OF CORRECTION

PATENT NO. : 4,449,030
DATED : May 15, 1984
INVENTOR(S) : Blomdahl

It is certified that error appears in the above-identified patent and that said Letters Patent is hereby corrected as shown below:

Front page, [57] ABSTRACT, line 9, "said" should be --the--.

Signed and Sealed this

Nineteenth Day of February 1985

[SEAL]

*Attest:*

DONALD J. QUIGG

*Attesting Officer*   *Acting Commissioner of Patents and Trademarks*